(12) United States Patent
Best et al.

(10) Patent No.: US 6,399,134 B1
(45) Date of Patent: Jun. 4, 2002

(54) SOFT TEXTURED, AQUEOUS-BASED ICE CONFECTION

(75) Inventors: Eric Thomas Best; Ronald P. Renati; George F. Tonner, all of Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/507,468

(22) Filed: Feb. 22, 2000

(51) Int. Cl.[7] ................................................. A23G 9/00
(52) U.S. Cl. ........................ 426/565; 426/578; 426/654
(58) Field of Search ................................. 426/565, 100, 426/101, 103, 578, 654

(56) References Cited

U.S. PATENT DOCUMENTS

| | | | |
|---|---|---|---|
| 2,048,364 A | * 7/1936 | Willems | |
| 2,191,352 A | 2/1940 | Oprean | 99/134 |
| 2,360,559 A | 10/1944 | Glazer | 99/136 |
| 3,752,678 A | 8/1973 | Jenkinson et al. | 99/136 |
| 3,770,460 A | * 11/1973 | Vroman | |
| 3,996,389 A | 12/1976 | Osborne | 426/565 |
| 4,346,120 A | 8/1982 | Morley et al. | 426/565 |
| 4,415,595 A | * 11/1983 | Takemori et al. | |
| 4,826,656 A | 5/1989 | Huber et al. | 426/565 |
| 5,077,075 A | 12/1991 | Wade | 426/564 |
| 5,084,295 A | 1/1992 | Whelan et al. | 426/565 |
| 5,215,777 A | 6/1993 | Asher et al. | 426/565 |
| 5,256,426 A | * 10/1993 | Tomioka et al. | |
| 5,424,088 A | * 6/1995 | Christianson et al. | 426/578 |
| 5,456,936 A | 10/1995 | Toonen | 426/567 |
| 5,605,712 A | 2/1997 | Bertrand et al. | 426/565 |
| 5,660,866 A | * 8/1997 | Tomioka et al. | |
| 5,968,582 A | * 10/1999 | Vaghela et al. | 426/565 |
| 6,083,546 A | * 7/2000 | Carrick et al. | |
| 6,093,438 A | * 7/2000 | Vaghela et al. | 426/565 |
| 6,187,365 B1 | * 2/2001 | Vaghela et al. | 426/565 |

FOREIGN PATENT DOCUMENTS

| | | |
|---|---|---|
| EP | 0 249 446 A2 | 12/1987 |
| EP | 0 290 054 A2 | 11/1988 |
| EP | 0 500 940 B1 | 9/1992 |
| EP | 0 560 052 A2 | 2/1993 |
| EP | 0 710 074 B1 | 8/1995 |
| WO | WO 98/04149 | 2/1998 |

OTHER PUBLICATIONS

Arbuckle, "Ice Cream", third edition, p. 39, 294–296 (1977).*

* cited by examiner

*Primary Examiner*—Nina Bhat
(74) *Attorney, Agent, or Firm*—Winston & Strawn

(57) ABSTRACT

An aqueous-based frozen confection having a hardness of 20–100 g and containing 0.2–0.5% a stabilizer composition of a mixture of guar, locust bean gum, carboxymethylcellulose and carrageenan. Preferably, the stabilizer elements in the stabilizer composition are present in relative amounts in relative amounts in parts by weight: guar 8–20, locust bean gum 1.5–4.5, carboxymethylcellulose 1.2–2.8 and carrageenan 0.6–1.4.

18 Claims, No Drawings

SOFT TEXTURED, AQUEOUS-BASED ICE CONFECTION

TECHNICAL FIELD

The present invention is directed to aqueous-based frozen confections that have very soft textures, including the use of a special stabilizer composition, to methods for preparing such frozen confections, and to products containing such confections.

BACKGROUND ART

Frozen aqueous-based ice confections including popsicles, ice lollies, slushes, sorbets, and combination products in which such materials are adjoined to products such as ice cream, and the like, are well known. Such products are a sweet medium for carrying various flavors and/or juices in a convenient, solid, refreshing and cooling manner and usually have interesting shapes.

Ice confectionery products may be single serve items, such as on a stick, in a push up tube, or otherwise wrapped for easy consumption. Ice confectionery products may also be in the form of desserts, more or less elaborate, for consumption at a table. Ice confectionery products may also be used as a basis for the preparation of other foods and drinks including, but not limited to, alcoholic beverages.

In order to prepare and to preserve such products through distribution and sales channels, it is normal to use deep freezing processes. Typical procedures are described in Arbuckle (1986) "Ice Cream", $4^{th}$ Edition, AVI Publishing and in similar publications. It is also normal for such products to inadvertently receive temperature fluctuations or heat shocks during distribution, sales and/or domestic transport and storage. Either, or both, of these aspects can, and do, lead to the generation of hard textures which is a significant drawback. Hard textures lead to a number of problems. These include, but are not limited to, the following aspects:

Suppression of flavor releases causing loss of immediate impact.

The need for prolonged chewing to break up the mass, causing a leaching out of flavor during the consumption process, and the generation of a residual flavorless mass in the mouth.

Suppression of refreshing aspects, such suppression being caused by a slow release of other formulation elements, for example fruit acids.

Product messiness caused by random fracturing under high cleavage pressures. This includes product pieces falling off and onto the ground or the clothing. This can be a special problem as such products may be highly colored and are popular with children.

Random fracturing includes causes difficulties in cutting attractive pieces with well-defined edges, and difficulties serving uniform portions from a larger table dessert.

Product messiness also arises by de-laminations occurring at the junction of the hard ice confection and any softer adjoined products such as ice cream and the like.

Several methods have been previously proposed in attempts to overcome the problems of hardness in aqueous-based ice confections. In U.S. Pat. No. 2,191,352 as in European Patent Application 0,560,052 gelatin was used to prepare a low calorie stick. Arbuckle p. 88 also refers to gelatin as imparting smoothness of texture and the prevention of large crystals of ice forming during freezing. Arbuckle's comments on this page are regarding ice cream, but Arbuckle acknowledges on p. 291 that the freezing process of ices is similar to that of ice creams.

There are significant drawbacks, however, with the gelatin approach.

Gelatins, have relatively high set points of between 25–30° C. [see Ward A. G., and Courts A., (1977) The Science and Technology of Gelatin, p. 312, Academic Press, London, New York, San Francisco]. This inhibits the choices of production operating procedures. This relatively high set point means that operating temperatures have to be even higher in order to process the material in a fluid form.

Another drawback is that water ices containing gelatin still have high viscosity when processed at temperatures close to their set point. Such high viscosity inhibits pouring, coating, layering, enrobing, spraying, pumping, dipping, sucking, or molding types of operations. When operating close to the material's set temperature, one also observes large variations in the viscosity with any incidental minor temperature fluctuations. This leads to gross changes in product characteristics and resultant high variability in weight, portion, volume and shape control.

Operating at relatively high temperatures, either to avoid setting, or at even higher temperatures to reduce fluid viscosity, also seriously hinders co-processing with ice cream and related frozen ice confection products because these co-products will melt readily when contacted with such high temperatures.

Gelatin, being an animal protein, also has special issues with certain vegetarian, religious and other persuasions.

In U.S. Pat. No. 3,752,678 thixotropic gels such as alginate or xanthan were used. Thixotropic gels have essentially similar issues in terms of physical properties as gelatin. These include operating close to the set points, and suffering the drawback of viscosity sensitivity to temperature etc. Further, thixotropic gels require the addition of controlled shear forces in order to initiate short-term, time related thinning of the viscosity for the generation of the appropriate fluidity characteristics.

In U.S. Pat. No. 2,360,559, product softness was achieved by adding milk solids. Milk solids have the drawback of altering the characteristics of aqueous-based ice confections in several ways including, but not limited to:

Reducing the desirable clarity of the article.

Changing the perceived color of the article because of added whiteness.

Changing the flavor of the article.

Inhibiting the utilization of components that would change the nature of the milk protein, for example fruit acids that would lead to coagulation or clotting.

Reducing the contrast that can be achieved in combination products such as with ice cream or similar types of products.

In European Patent No. 0 500 940, a combination of both softness and ruggedness was achieved by a special process with the generation of loose aggregates of ice crystals and shock cooling with liquid nitrogen. Ruggedness is not always a desirable attribute. Liquid nitrogen systems have other drawbacks being expensive in installation and operation and requiring special factory process line enclosure, and vent control, both for insulation and to prevent possible oxygen deprivation to employees. Such enclosures further inhibit access to operating lines for change parts and maintenance.

In European Patent Application 0,710,074, a freeze-coating method was proposed. This involved three steps. First a core material was pre-cooled. This was then used to support the aqueous-based ice confection after an immersion operation, using conduction from the core material to freeze a layer of the ice confection into place. Finally, fast cooling of the whole was employed to inhibit growth of the initial ice crystals, during the phase transformation of the remaining water. This final stage being preferably by liquid nitrogen dipping.

In PCT publication WO 98/04149, a freeze coating process was also utilized, in which a rheometry value of more than about 1.0 was required in the coating, which was then adhered to the milk containing ice confection in an immersion process and rapidly cooled to −15 ° C. or lower.

The freeze-coating techniques, such as the above two last references, have a number of disadvantages of which the following are examples, but which do not represent an exhaustive list:

Not all aqueous-based ice confections desire to be presented with an interior core support material.

Controls of temperatures and times are critical. This is not always easy in the event of process line stoppages.

The freezing point depression of certain ingredients introduces limitations in the flexibility of compositions.

Although initially small ice crystals do contribute to softness of texture, the ice crystals re-align, grow and change shape during temperature fluctuations that occur during storage and distribution.

There are geometry restraints to an immersion process. The aqueous-based ice confection principally can only form a layer (albeit with some potential to be designed in variable thickness) around the geometry of the supporting core shape.

The issues with liquid nitrogen and similar cryogenic liquids were previously mentioned.

Owing to the limited thermal conduction of freezing aqueous-based ice confection material, multiple immersions may be essential to achieve a desired thickness.

Fine detail of shape is lost on multiple dippings.

Thus, there remains a need for improved soft-textured aqueous-based ice confections. The present invention teaches how to obtain such products without the aforementioned disadvantages.

SUMMARY OF THE INVENTION

The present invention is directed to soft, aqueous-based ice confections, with specific hardness characteristics, and containing a specific composition of hydrocolloid materials, also to methods of preparing such and to products containing such.

Unlike prior art approaches to soft aqueous-based ice confections, the viscosity of the aqueous based ice confection in its liquid form is not excessively high. Similarly, the viscosity is not subject to excessive variability in its viscosity and related rheological properties as effected by small temperature, time or shear dependency variations for the following reasons:

It is not necessary to have the material close to a gelling point temperature.

It is not necessary to have the material freeze upon contact with other materials.

It is not necessary to utilize high levels of gelling hydrocolloids.

The specific low viscosity, high liquidity characteristics of the aqueous-based ice confection in its liquid form permits easy and fine detailed product shaping. One example of this is in mould filling operations, where there is little risk of any imperfect contact with mold walls owing to entrained air pockets. Further these characteristics avoid the requirements for specialized pressurized filling machinery or the mechanical complexities of bottom up fillers. Further, in a molding operation, the low viscosity permits more rapid heat transfer through the material. Also, in terms of metrology and localized compositional conformity, it is relatively easy to suck out a uniform central portion of the aqueous based ice confection for subsequent filling with another material in the classic "shell and core" type of operation. This latter point means that both total weight and material proportion control is enhanced, and also that any variations in thickness of the two components is minimized. Other methods of shaping and forming are similarly benefited.

The hardness of the frozen aqueous-based ice confection is between 20 and 100 grams as determined by texture analysis according to the method described hereinafter. The hardness of the aqueous-based ice confection remains within this range ±25% after heat shock by the method described hereinafter and after the same texture analysis testing according to the method described hereinafter.

A slow quiescent freezing process may be employed without the expected generation of a hard texture. Further, heat shocks may also occur to the product without the product hardening that would normally be anticipated by an ice crystal growth mechanism.

The frozen, soft textured, aqueous-based ice confection has benefits in the lower energies required to initiate deformation or cleavage. These benefits exhibit themselves in direct consumption characteristics including high flavor release and a less messy eat. The benefits also exhibit themselves in the ease of utilizing such soft textured products as components in other foodstuffs. For example in the preparation of a slush based alcoholic drink, less time is required in the blender to achieve desired smoothness and the risks of expelling hard chunks from the blender is reduced.

The hydrocolloid containing composition in terms of types, grades and proportions of hydrocolloid materials permits such unexpected low hardness characteristics and the stability of this low hardness. The preferred hydrocolloid types are guar, locust bean gum (LBG), sodium carboxymethyl cellulose (CMC), and kappa carrageenan. These hydrocolloid materials act in combination to generate the beneficial physico-chemical influences upon the ice particle surfaces during their creation and aging and also upon the interstitial material(s).

Other texturizing agents are optional components should modulation of other textural parameters such as adhesiveness, springiness, cohesiveness, gumminess, chewiness, resilience etc. be desirable. Optional components may also include colors, flavors, sweeteners etc.

The present invention relates to such soft, aqueous-based ice confections made by various molding, shell-molding, extrusion, co-extrusion, enrobing, spray, immersion or layer processes and frozen in a quiescent manner. By quiescent manner is meant, for example, not in an agitated scraped surface freezer.

The present invention also relates to products made containing such soft, aqueous-based ice confections including, but not limited to, compounded products which combine soft, aqueous based ice confections with other types of ice confections. Also to combinations of soft aqueous-based ice confections and other materials such as cakes, desserts, drinks etc.

DETAILED DESCRIPTION OF THE PREFERRED EMBODIMENTS

The present invention is directed to soft, aqueous-based ice confections, containing a specific composition of hydrocolloid materials and having a specific hardness of between about 20 to 100 g and preferably between about 30 and 90 g. The products of this invention further survive controlled heat shock procedures and retain their original hardness values in the above range to a tolerance of ±50% and preferably ±33%. The method of preparation in addition to including the use of the specific composition of hydrocolloid materials involves solution preparation procedures to ensure complete dispersion of the hydrocolloid elements but to achieve only partial solution of the locust bean gum. The present invention is also directed to products made using these soft, aqueous-based ice confections. These include, but are not limited to, combinations with ice cream type products in the form of single serve items, to frozen puddings and desserts which may be for single serve or for cutting up into multiple portions, and to frozen or partially frozen drinks.

In order to determine softness of the aqueous-based ice confections or the aqueous-based ice confection portion of compound products, samples made according to the invention were stored for a minimum of 1 week at −30° C. in order to ensure complete hardening as normal in primary cold storage.

The hardness characteristics were determined using a Stable Micro Systems TAXT/2 texture analyzer available from Texture Technologies Corporation at 18 Fairview Road, Scarsdale, N.Y. 10583. The samples were tempered for 24 hours in a freezer set to −15° C. before testing. After unwrapping the samples were placed upon an insulated flat surface and their surface temperatures measured using an infrared surface thermometer. Measurements were conducted immediately the surface temperature read −12° C. ±0.2° C. A minimum of 5 separate samples was tested. Results from any samples that flexed, wobbled or otherwise moved during the testing procedure were rejected and further samples used for testing.

The test consisted of inserting a standard TA-9 needle exactly 2 mm. into the sample, at a speed of 1.0 mm./s. A load cell was attached to the needle that detected the onset of the surface contact and then measured the force encountered during the test.

A heat shock protocol (hereinafter "HS") was also used to simulate in a controlled manner the thermal stresses expected to be sustained in distribution and sales of such aqueous-based ice confections. The heat shock protocol was to subject products previously hardened by storage of at least 1 week at −30° C. to fluctuating temperatures over a period of 2 weeks duration. The temperature fluctuation was induced with a "hot" temperature of −8° C. and a "cold" temperature of −20° C. To maintain a cycle wide enough to minimize any effects of product size and shape a cycle time with 12 hours at the hot temperature and 12 hours at the cold temperature was utilized.

The specific composition of hydrocolloid materials is based in part upon preferred grades of materials.

The preferred guar grade is a wet-milled type with a viscosity range of 3,000 cps (centipoises) as determined on a 1% aqueous solution at 25° C. after 60 min by using a Brookfield viscometer (commercially available from Brookfield Engineering Laboratories of Stoughton, Mass.). The preferred locust bean gum grade has a viscosity of 2,000 cps. The preferred sodium carboxymethylcellulose (CMC) grade has a degree of substitution of 80% and a viscosity of 5,000 cps. The preferred carrageenan grade is a kappa type.

The ratio of the preferred hydrocolloids may be varied by up to ±40% each, around the following mean values, and preferably by up to ±20% each, around the following mean values, by weight:

| component | preferred amount | acceptable ranges |
| --- | --- | --- |
| Guar | 14.0 parts | 5–25, preferably 8–20 parts |
| Locust bean gum | 3.0 parts | 1–5, preferably 1.5–4.5 parts |
| Sodium carboxymethyl cellulose | 2.0 parts | 1–3, preferably 1.2–2.8 parts |
| Kappa carrageenan | 1.0 parts | 0.3–2, preferably 0.6–1.4 parts. |

The total amount of the preferred grades of hydrocolloids is between about 0.2% and 0.5% by weight of the final aqueous-based ice confection product, and preferably between about 0.3% and 0.4% by weight of the final aqueous-based ice confection, or of the portion of aqueous-based ice confection in a compound product.

The total amount of hydrocolloids may be increased in the event of using lower viscosity grades of materials, or reduced in the event of using higher viscosity grades of material. To calculate the desired changes in the total amount of hydrocolloids, the sum of the individual component hydrocolloid amounts is re-established after taking into account changes in the level(s) of any single or combination of hydrocolloids based upon viscosity equivalency.

In order to use alternate viscosity grades of the hydrocolloid materials, concentration/viscosity plots using equivalent protocols are required in order to determine equivalency to the preferred grade of material.

The method of manufacturing such products required initially achieving an aqueous dispersion of the hydrocolloid particles such that cellular clumps in excess of ten cells could not be determined under an optical microscope at 100× nmagnification. This may be achieved before, after or during the addition of other optional ingredients. A typical procedure would be to add the stabilization system into the water using a Lanco type mixer already running on slow speed, and to continue mixing at slow speed for at least 2 minutes.

The aqueous-based ice confection may then be pasteurized, however it is considered important not to exceed a temperature that would completely dissolve all the cells of the locust bean gum element of the stabilization system. Typically, this could occur if the pasteurization temperature was much in excess of 90° C. The presence of undissolved locust bean gum cells in the pasteurized aqueous-based ice confection may be determined with the aid of a microscope at 100× magnification.

Without wishing to be bound by theory, it is understood that the portion of undissolved locust bean gum cells may at least partially serve as a seeding site for the initiation of ice particle solidification. Other, undissolved materials, including those from optional ingredients such as fruit pulp, may also serve in such a function but have not been found to be as efficient in this respect.

The pasteurized aqueous-based ice confection may then be shaped by a variety of methods, including but not limited to various molding, template usage or other forming procedures, while it is still very fluid in order to ensure good conformance to the chosen shaping system.

Solidification of the system may then be accomplished in a quiescent manner. For example, a typical rate of hardening might be that attained in a static freezer at −30° C. without air blast. Surprisingly, the product does not assume a hard icy texture during this procedure. A faster cooling such as by placing in a blast freezer set at −40° C. also gives satisfactory products. Equally successful is to insert a mold containing the aqueous-based ice confection into a brine bath at −35° C., then to demold the product by dipping the mold in warm water or by spraying warm water against it and then quiescently freeze the product to −30° C.

In the event of a brine bath cooling the molded aqueous-based ice confection may be de-molded after completely freezing, with a stick inserted if desired. Alternatively, a mold may be partially emptied, by any of a variety of means including tipping or sucking out, after only a wall of the aqueous-based ice confection has solidified. In this latter case, the center of the mold may then be filled with another material to form a two component aqueous-based ice confection. Further, the mould may be initially filled with another composition, and in a similar manner, the emptied center may be filled with the aqueous-based ice confection. This latter option is particularly enabled by this invention, because soft textures prevail even during the slower freezing rate that occurs when an insulated layer on the wall of the mold inhibits the heat transfer coefficient.

It is particularly novel that aqueous-based ice confections containing the specific stabilizer composition and processed as described can give soft textures in quiescent freezing processes. What is also surprising is that the introduction of faster freezing processes, such as by using liquid nitrogen contact procedures, do not benefit and have even been demonstrated to harm the softness of the texture of products made according to this invention. Yet, with the prior state of the art it might have been expected that smaller ice crystals would be formed by fast freezing; an effect which might have been anticipated to give softer textures. There is therefore the ability to create desirable soft textured aqueous-based ice confections without the inconveniences, drawbacks and disadvantages of having to utilize either non-quiescent or ultra-fast freezing protocols.

Without wishing to be bound by theory, it appears that the slower freezing rate is beneficial to the operation of the present invention in that it permits the appropriate stabilizer elements to react with the initiated ice nuclei in an appropriate surface-active manner. In the vicinity of such ice nuclei, a fast freezing process would rapidly enhance the viscosity of the intervening fluid and inhibit the mobility of the fluid-phase stabilizers.

Importantly, the aqueous-based ice confection of the present invention does not generate large ice particles, rather a preponderance of small, round-shaped ice particles. The force required to penetrate the mass of ice crystals and the glassy intervening matrix of the frozen aqueous based ice confection of the present invention was also small. Further, these ice crystals showed minimum growth during heat shock and there was minimal change in the hardness during heat shock.

The frozen, soft textured, aqueous-based ice confection has further benefits in the lower energies required to initiate deformation or cleavage.

These softness benefits exhibit themselves in direct product consumption characteristics including high and sustained release of flavor, refreshment and sweetness; whereas hard textures are more difficult to disintegrate and release entrapped elements. These softness benefits also exhibit themselves in a less messy eat. This latter effect is related to the avoidance of fragmentation into larger random shaped particles. Softness is also an important benefit for people having limited ability to crunch. This category includes young children, elderly consumers, those without a full set of teeth, and people with certain medical problems.

The softness benefits also exhibit themselves in the ease of utilizing such soft textured products as components in other foodstuffs.

One example is in compound products, including but not limited to, soft items such ice creams, pieces of fruit etc. Here the forces required to initiate deformation or cleavage are less likely to exceed the forces that would lead to delaminating problems. Another example is in the ease of cutting up and serving uniform and well-shaped portions from a frozen cake or dessert containing aqueous-based ice confections. Also, in the preparation of a slush based alcoholic drink, less time is required in the blender to achieve the desired smoothness and the risks of expelling relatively large hard chunks from the blender is reduced.

Additionally, the softer aqueous-based ice confection is more suited to industrial post-freezing cutting and forming procedures which may include guillotining, slitting, pressing, die stamping and the like, either individually or when in combination with other foodstuffs.

EXAMPLE

The invention is further illustrated, but not limited, in the following working examples in which parts and percentages are by weight unless otherwise stated.

Example 1
The following recipe was prepared:

| Ingredients | % |
| --- | --- |
| Water, hot, tap | 61.85 |
| Sucrose, granulated | 20.2 |
| Strawberry puree, 28 Brix | 10.1 |
| Corn syrup, 36 DE | 7.1 |
| Color solution | 0.4 |
| Guar | 0.245 |
| Locust bean gum | 0.053 |
| Sodium carboxymethyl cellulose | 0.035 |
| Kappa carrageenan | 0.017 |

The water was placed in a Lanco mixer and agitated at slow speed. Corn syrup and sucrose were added. Guar, locust bean gum, sodium carboxymethyl cellulose and kappa carrageenan were added. The agitation was continued at slow speed for 2 min to ensure adequate dispersion. Strawberry puree and color solution were added. Agitation was continued for 1 minute. The mix was pumped through a pasteurization system with a hold time of 30 seconds at 85° C. The mix was then cooled to 5° C. and filled into molds. The molds were inserted in a freezing bath having a temperature of −35° C. until the product had semi-frozen, sticks were inserted and the product was completely frozen. The product was extracted after inserting the molds in a warn water bath at 27° C. for 15 seconds. The extracted product was then quiescently hardened to −30° C.

Products from storage at −30° C. were found to have a hardness of 61 g with a standard deviation of 3 g. After heat shock according to the method hereinbefore described, the products were found to have a hardness of 51 g, with a standard deviation of 4 g.

The ice particle size were visualized under the microscope, using the following technique:

Operations were conducted in a glove box maintained at −14° C. Samples of ice confection were diluted in mineral oil on a microscope slide in order to separate the ice particles. Samples were viewed at 80× magnification. Particle sized were determined by image analysis with 20 fields of view being used (approx. 2,000–3,000 particles).

The ice particles were observed to be predominantly round in shape and to have a mean diameter of 35 microns with a standard deviation of 1 micron. By round in shape is meant that the longest dimension divided by the shortest dimension does not exceed an average value of 2.5. This indicates that the rather slow freezing process does not permit the growth of large ice particles when the present specific stabilizer composition is employed. In particular, ice particles of elongated and/or branched shape and larger average size would have been expected from the build up of liquid water upon nascent ice nuclei.

For comparison purposes, a range of samples of the commercial freeze-coated product named SOLERO (R) (according to European Patent Application 0,710,074), were obtained from the marketplace, presumably post heat shock and found to have a hardness of 120 g with a standard deviation of 13 g.

Also for comparison purposes, products were made according to the teachings of example 1 of U.S. Pat. No. 3,752,678 and were found to have a hardness after heat shock of 333 g with a standard deviation of 16 g.

Example 2

Product was prepared as Example 1 except that when a frozen layer of 2 mm thickness was achieved on the side wall of the molds, the liquid contents from the centers of the molds were sucked out. The empty spaces in the molds were then filled with ice cream of normal molding quality in order to produce a "split".

Products from storage at −30° C. were found to have a hardness of 59 g with a standard deviation of 5 g.

Products after heat shock, were found to have a hardness of 39 g with a standard deviation of 2 g.

This demonstrates that the product performs in a shell and core application of preparing a multi-component product Hardnesses on some "regular" shell and core products of the marketplace, i.e. without the specific stabilizer combination according to the invention getting average value of 206 g with a standard deviation of 20 g, presumably post heat shock.

Dipping the product of this Example in liquid nitrogen was tried, on the basis that rapid cooling would give smaller ice crystals and softer texture according to the teaching of EP 0710074. The liquid nitrogen result was surprisingly hard with an average hardness value of 163 g (confirmed on 5 repeats to be significantly harder). This indicates that the specific stabilizer system according to the invention is better for slower freezing.

Example 3

Product was prepared as in Example 1 except that after extraction of the products from the molds, they were dipped in chocolate coating in the normal manner, with a chocolate coating temperature of 40° C.

Products were dissected by scalpel to remove the chocolate before texture assessment.

Products from storage at −30° C. were found to have a hardness of 62 g with a standard deviation of 8 g.

Products after heat shock were found to have a hardness of 45 g with a standard deviation of 3 g.

This demonstrates that the softness achieved is stable to the thermal shock of dipping the product in melted chocolate at 40° C.

Example 4

In order to determine whether all four stabilizer elements in the specific stabilizer composition of the invention were critical, a special experiment was done in which each of the different elements were in turn omitted (comparison 1, 2, 3 and 4) in the manufacture of a regular shell and core product, which was produced as in Example 2. The following Table 1 relates to hardness, before and after heat shock.

TABLE 1

| Product | Hardness (fresh) | SD | Hardness (after heat shock) | SD | Change (%) |
| --- | --- | --- | --- | --- | --- |
| Example 2 | 65 | 6.3 | 64 | 5 | −1 |
| Comparison 1, no Guar* | 253 | 8.6 | 159 | 14.8 | −38 |
| Comparison 2, no LBG* | 207 | 24 | 145 | 13.7 | −30 |
| Comparison 3, no CMC* | 195 | 11 | 255 | 26.9 | 31 |
| Comparison 4, no Carrageenan* | 135 | 5.6 | 105 | 11 | −22 |

*Note that stabilizer system was re-adjusted to the same total dose level, (0.35%), when an element was removed, other elements were increased pro rata.
SD: Standard deviation It can be seen from Table 1 that the resistance to heat shock is also changed when any one of the elements of the specific stabilizer composition is omitted.

What is claimed is:

1. An aqueous-based frozen confection having a hardness of 20–100 g and comprising a plurality of ice nuclei and a stabilizer comp about 0.2% to 0.5% by weight of the confection, the stabilizer composition comprising the combination of guar, locust bean gum, a carboxymethylcellulose and a carrageenan as stabilizer elements which, in combination, are present in an amount sufficient to react with the ice nuclei to slow the freezing rate thereof so as to provide the desired hardness in the confection, wherein the stabilizer elements in the stabilizer composition are present in relative amounts in parts by weight: guar 5–25, locust bean gum 1–5, carboxymelthylcellulose 1–3 and carrageenan 0.3–2.

2. The confection of claim 1 having a hardness of about 30–90 g, wherein the stabilizer composition is present in an amount of about 0.3–0.4%.

3. The confection of claim 1, in which:
a) the guar has a viscosity of 3,000 cps ±33%
b) the locust bean gum has a viscosity of 2,000 cps ±33% and
c) the carboxymethylcellulose has a viscosity of 5,000 cps ±33%.

4. The confection of claim 1 in which the stabilizer elements in the stabilizer composition are present in relative amounts in relative amounts in parts by weight: guar 8–20, locust bean gum 1.5–4.5, carboxymethylcellulose 1.2–2.8 and carrageenan 0.6–1.4.

5. The confection of claim 1 in which the stabilizer elements in the stabilizer composition are present in relative amounts in relative amounts in parts by weight: guar 11–17, locust bean gum 2.4–3.6, carboxymethylcellulose 1.6–2.4 and carrageenan 0.8–1.2.

6. The confection of claim 1 in which the hardness does not vary by more than 50% from its original value after subjecting the product to a heat shock protocol.

7. The confection of claim 1 in which the hardness does not vary by more than 33% from its original value after subjecting the product to a heat shock protocol.

8. A compounded ice confection product comprising first and second components wherein the aqueous-based frozen confection of claim 1 is present as one of the components of the product.

9. The compounded ice confection product of claim 8, wherein the first component is a shell and the second component is a core.

10. The compounded ice confection product of claim 9, wherein the aqueous-based frozen confection is present as the core.

11. An aqueous-based frozen confection having a hardness of 20–100 g and comprising a plurality of ice nuclei; one or more of a color, a flavor or a sweetener; and a stabilizer composition in an amount of about 0.2% to 0.5% by weight of the confection, the stabilizer composition comprising the combination of guar, locust bean gum, a carboxymelthylcellulose and a carrageenan as stabilizer elements in amounts which, in combination, are sufficient to control ice particle solidification to obtain, after freezing, the desired solidification, and in which the stabilizer elements in the stabilizer composition are present in relative amounts in parts by weight: guar 5–25, locust bean gum 1–5, carboxymethylcellulose 1–3 and carrageenan 0.3–2.

12. The confection of claim 11 having a hardness of about 30–90 g, wherein the stabilizer composition is present in an amount of about 0.3–0.4%.

13. The confection of claim 11 in which:

a) the guar has a viscosity of 3,000 cps ±33% b) the locust bean gum has a viscosity of 2,000 cps ±33% and c) the carboxymethylcellulose has a viscosity of 5,000 cps ±33%.

14. The confection of claim 11 in which the stabilizer elements in the stabilizer composition are present in relative amounts in relative amounts in parts by weight: guar 8–20, locust bean gum 1.5–4.5, carboxymethylcellulose 1.2–2.8 and carrageenan 0.6–1.4.

15. The confection of claim 11 in which the hardness does not vary by more than 50% from its original value after subjecting the product to a heat shock protocol.

16. A compounded ice confection product comprising first and second components wherein the aqueous-based frozen confection of claim 11 is present as one of the components of the product.

17. The compounded ice confection product of claim 16, wherein the first component is a shell and the second component is a core.

18. The compounded ice confection product of claim 17, wherein the aqueous-based frozen confection is present as the core.

* * * * *

UNITED STATES PATENT AND TRADEMARK OFFICE
CERTIFICATE OF CORRECTION

PATENT NO. : 6,399,134 B1
DATED : June 4, 2002
INVENTOR(S) : Best et al.

It is certified that error appears in the above-identified patent and that said Letters Patent is hereby corrected as shown below:

Column 10,
Line 35, change "comp" to -- composition in an amount of --.

Signed and Sealed this

First Day of October, 2002

*Attest:*

*Attesting Officer*

JAMES E. ROGAN
*Director of the United States Patent and Trademark Office*